UNITED STATES PATENT OFFICE.

WILLIAM R. WARREN, OF NEW YORK, N. Y.

PROCESS OF MAKING HYDRAULIC CEMENT.

1,123,964. Specification of Letters Patent. Patented Jan. 5, 1915.

No Drawing. Application filed March 6, 1914. Serial No. 822,898.

*To all whom it may concern:*

Be it known that I, WILLIAM R. WARREN, a citizen of the United States, and a resident of the city, county, and State of New York, have invented certain new and useful Improvements in Processes of Making Hydraulic Cement, of which the following is a specification.

My invention relates to the production of hydraulic cement.

The purpose of my invention is to provide an economical and efficient process of producing a uniform grade of hydraulic cement having all the characteristics desirable in a hydraulic cement. In fact a cement produced by my process is in some respects superior to high grade Portland cements. For example it is more durable; it is a much less expanding material; it is much less susceptible to harmful influences of salt solutions; and it is much less affected by extreme temperature variations.

The various steps of my process and the special advantages thereof will appear in the course of the following description thereof and its essential features will be pointed out in the appended claims.

In carrying out my invention I first choose a material, or make a mixture of materials, carrying lime, (or lime and magnesia) silica and alumina and melt the same in a suitable furnace. The furnace employed may be of any type adapted to produce the required temperature, as for example an electric furnace, a cupola or a regenerative furnace. Whatever the form of furnace employed, the material is melted under non-reducing or oxidizing conditions. Where a carbonaceous fuel, solid or gaseous, is employed these conditions may be obtained by a blast of air of sufficient volume to produce a substantially complete combustion of the fuel. The purpose of melting under neutral or oxidizing conditions is to prevent the reduction of any substantial amount of iron or other metal that may be present in the materials in the furnace, so that it is not necessary to periodically stop operations to remove the molten metal and there is a substantially uniform rate of melting and the melt of the furnace is permitted to flow therefrom continuously at substantially this uniform rate. The furnace being operated under neutral or oxidizing conditions, there will be substantially no molten metal carried with the melted silicates and interfering with the operation of my process. By maintaining a substantially continuous flow of the melt from the furnace I avoid the various evils of intermittent operation, for, where there is intermittent operation, the apparatus for handling the melt during the further operation of the process must be relatively large and expensive to take care of the large flow from the furnace while it is intermittently giving out its melt, or else the melt must be stored in ladles or other suitable reservoirs which adds considerably to the expense of the process while tending to produce less uniform results.

According to my process the non-volatile constituents of the materials with which the furnaces are charged should contain approximately fifty per cent. of lime or lime and magnesia. Some variation from fifty per cent. is, of course, permissible. As at present advised, however, I believe it is not practicable in the operation of my process, to have more than fifty-two or fifty-three per cent. of lime, or lime and magnesia. By employing material in which the lime or lime and magnesia contents is approximately 50% of the non-volatile constituents, I find that the batch may be actually fused or melted at comparatively low temperatures, indeed at temperatures materially below those hitherto required for clinkering Portland cement mixtures. The materials to be melted may vary widely but I prefer to use stone as found in nature, thus avoiding expensive raw materials, and, as a specific instance, I may state that I have obtained excellent results by melting together thirteen hundred parts of cement rock with one hundred parts of slate, both broken to about two inch pieces, in a cupola with two hundred and fifty parts of coke, there being introduced into the cupola a blast of air having a pressure of from six to seven ounces and sufficient in volume so that substantially all the carbon of the coke is converted into carbon dioxid.

A specific melt suitable for my process and which may be produced from such a mixture of materials as I have mentioned, is composed of calcium oxid, 48%; magnesium oxid, 3%; silica, 35.5%; alumina and iron oxids, 12.5% and sodium and potassium oxids, 1%.

The melt flowing from the furnace is immediately subdivided into small particles while still molten and this subdivision is accomplished in the presence of a fine spray of an aqueous solution of one or more metallic sulfates, magnesium sulfate being in most instances preferable.

The fine subdivision of the still molten material may be effected in various ways, as, for example, by allowing the molten material to flow upon a rapidly rotating drum or table in a chamber wherein a fine spray of solution of magnesium sulfate, salt preferably of an alkali forming metal or metals, or equivalent sulfate is injected capable of increasing the hydraulic properties of the material. The addition of this salt produces, I believe, in the resulting cement, a Sorel cement or its equivalent, which gives the material the desired cementitious activity, and consequently the salt added for this purpose will vary with the nature of the raw material used, and any salt which will produce this Sorel cement or its equivalent in the finished product to give it the desired cementitious activity, may be used. By the term alkali forming metals, I mean both the alkali metals and the alkaline earth metals. A five per cent. solution of magnesium sulfate is ordinarily satisfactory. The density of the spray must be governed by two considerations. There should be enough of the solution present relatively to the amount of material flowing so that a rapid cooling and solidification of the finely divided material is effected. On the other hand, the molten material must not be subjected to such large volume of spray that it will cool to the point of permanently retaining moisture before it can be removed from the presence of the spray. I have found that on the average about seventy-five gallons of spray to one ton of molten material will give very satisfactory results. Under these conditions the divided particles of molten material solidify with great rapidity and fall to the bottom of the chamber containing the drum or table and the spray. By continuously removing the fallen particles of chilled material the same rapidly evaporate by their own heat the moisture remaining on them. This is important for it is impossible to make a satisfactory hydraulic cement according to this process if any moisture remains after the particles have become cold, subsequent drying being no remedy for the deterioration which such moisture effects.

The material is now a cement clinker having about fifty per cent. of lime, or lime and magnesia, contents. The material of this low line percentage when produced in the described manner need not be further heated. This low-lime material is an excellent hydraulic cement when finely ground and can be used without the addition of any further lime or other material, but it is slow setting and, therefore, the final step in practice, is to add about three per cent. of sulfate and hydrate of lime, which accelerates the setting time.

While it has been before suggested that molten blast furnace slag be treated with a spray in cement making, such a method has serious disadvantages overcome by the present process. In the production of such blast furnace slag, a reducing action occurs so that sulfids and molten metal are produced. The sulfids remain in the slag resulting in the production of an inferior cement, while the reduction of the metals necessitates a periodic stopping of the process which is of very serious consequence, as above explained. Furthermore, the slag from the blast furnace is not uniform in its composition. All these disadvantages are overcome by the present method.

The hydraulic cement produced in accordance with the foregoing process is a low-lime cement and is not, properly speaking, a Portland cement, but it will meet all the practical tests and requirements in service of a true Portland cement and can be produced much more cheaply and with greater uniformity than Portland cement can be produced, and has distinctive advantages as hereinbefore stated.

While I have described my process in great detail and have by way of illustration mentioned specific mixtures of materials, characters of melt, etc., I desire it to be understood that my process is not limited to any such detailed respects as the same may be modified in many ways without departing from the scope of the appended claims.

Having thus fully described my invention, what I claim and desire to protect by Letters Patent is:

1. The process of producing cement which consists in melting under oxidizing conditions, stone containing chiefly lime, silica and alumina, the lime content in the melt being approximately 50% of the non-volatile constituents of the material, and treating the material while molten with an aqueous solution of magnesium sulfate, to produce a finely divided dry hydraulic cement clinker in which the lime content is approximately 50% thereof.

2. The process of producing cement which consists in melting under non-reducing conditions material containing chiefly lime (or lime and magnesia), silica and alumina, the lime (or lime and magnesia) content of the melt being approximately 50% thereof and treating the material while molten with a solution of a salt of an alkali forming metal capable of increasing the hydraulic properties of the material and producing a finely divided dry hydraulic cement clinker in which the lime (or lime and magnesia) content is approximately 50% thereof.

3. The process of producing cement which consists in melting under non-reducing conditions, material containing chiefly lime (or lime and megnesia), silica and alumina, the lime (or lime and magnesia) content being approximately 50% thereof, and treating the material while molten with a solution of a Sorel cement-forming salt capable of producing Sorel cement or its equivalent in the finished product and thereby increasing the hydraulic properties thereof.

4. The process of producing hydraulic cement consisting in first charging a furnace with material containing lime (or lime and magnesia), silica and alumina, the lime (or lime and magnesia) content thereof being approximately 50% of the non-volatile constituents of said materials, melting the same in said furnace under non-reducing conditions, subdividing the silicates from said furnace, while still molten, into small particles in the presence of a spray of a solution of an alkali forming metal capable of increasing the hydraulic properties of the finished product, promptly removing the solid clinker from the presence of the spray, and grinding the dry clinker with a small percentage of a material adapted to accelerate the set of the cement.

5. The process of producing hydraulic cement consisting in first charging a furnace with material containing lime (or lime and magnesia), silica and alumina, the lime (or lime and megnesia) content thereof being approximately 50% of the von-volatile constituents of said materials, melting the same in said furnace, subdividing the silicates from said furnace while still molten into small particles in the presence of a spray of a solution of one or more salts capable of increasing the hydraulic properties of the finished product, removing the solid clinker from the presence of the spray and grinding the dry clinker.

6. The process of producing cement consisting in charging a furnace with material containing lime (or lime and magnesia), silica and alumina, the lime (or lime and magnesia) content thereof being approximately 50% of the non-volatile constituents of said material, melting the same under non-reducing conditions, and treating the molten mass with a solution of one or more salts of alkali forming metals capable of increasing the hydraulic properties of the finished product and producing a finely divided dry hydraulic cement clinker in which the lime (or lime and magnesia) content is approximately 50% thereof.

In testimony whereof, I have signed my name to this specification, in the presence of two subscribing witnesses.

WILLIAM R. WARREN.

Witnesses:
F. W. WHITE,
EDWIN SEGER.